US012712463B2

(12) United States Patent
Chen et al.

(10) Patent No.: US 12,712,463 B2
(45) Date of Patent: Aug. 18, 2026

(54) ISOLATED SWITCHING CONVERTER WITH CONTINUOUS CONDUCTION MODE AND DISCONTINUOUS CONDUCTION MODE

(71) Applicant: Chengdu Monolithic Power Systems Co., Ltd., Chengdu (CN)

(72) Inventors: Xuefeng Chen, Hangzhou (CN); Xia Zhou, Hangzhou (CN); Hui Li, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 172 days.

(21) Appl. No.: 18/821,467

(22) Filed: Aug. 30, 2024

(65) Prior Publication Data

US 2025/0080003 A1 Mar. 6, 2025

(30) Foreign Application Priority Data

Sep. 4, 2023 (CN) ........................ 202311135328.X

(51) Int. Cl.
*H02M 3/335* (2006.01)
*H02M 1/00* (2006.01)
*H02M 1/08* (2006.01)

(52) U.S. Cl.
CPC ..... *H02M 3/33592* (2013.01); *H02M 1/0058* (2021.05); *H02M 1/08* (2013.01)

(58) Field of Classification Search
CPC . H02M 1/0058; H02M 1/008; H02M 3/33592
See application file for complete search history.

(56) References Cited

U.S. PATENT DOCUMENTS

2014/0192565 A1* 7/2014 Wang ................ H02M 3/33592 363/21.14
2017/0155335 A1* 6/2017 Chang ..................... H02M 1/36
2022/0200466 A1* 6/2022 Guo ........................ H02M 1/38
2023/0188033 A1 6/2023 Chen et al.
2023/0188046 A1 6/2023 Chen et al.
2024/0039389 A1 2/2024 Chen et al.
2024/0039417 A1 2/2024 Chen et al.
2024/0113629 A1 4/2024 Chen et al.
2024/0113630 A1 4/2024 Chen et al.
2024/0421717 A1* 12/2024 Mondal ............ H02M 3/33592

* cited by examiner

*Primary Examiner* — Gary L Laxton
(74) *Attorney, Agent, or Firm* — Ashurst Perkins Coie US LLP

(57) ABSTRACT

A controller for an isolated switching converter having a transformer, a primary switch and a secondary switch. The controller has an error amplifying circuit, a mode judgement circuit and a gate driver. The error amplifying circuit provides a compensation signal based on an output feedback signal and a reference voltage. The mode judgement circuit provides a mode signal to determine a first drive mode or a second drive mode based on a voltage across the secondary switch and the compensation signal. In the first drive mode, the secondary switch is turned on for a second ON-time by the gate driver after a current flowing through the secondary switch crosses zero. And in the second drive mode, the ON-state of the secondary switch is extended for an extended ON-time by the gate driver.

23 Claims, 8 Drawing Sheets

VSRD
VO
ZVS1
ZVS0
Vcomp
First drive mode
Second drive mode
Vth1
Vth2

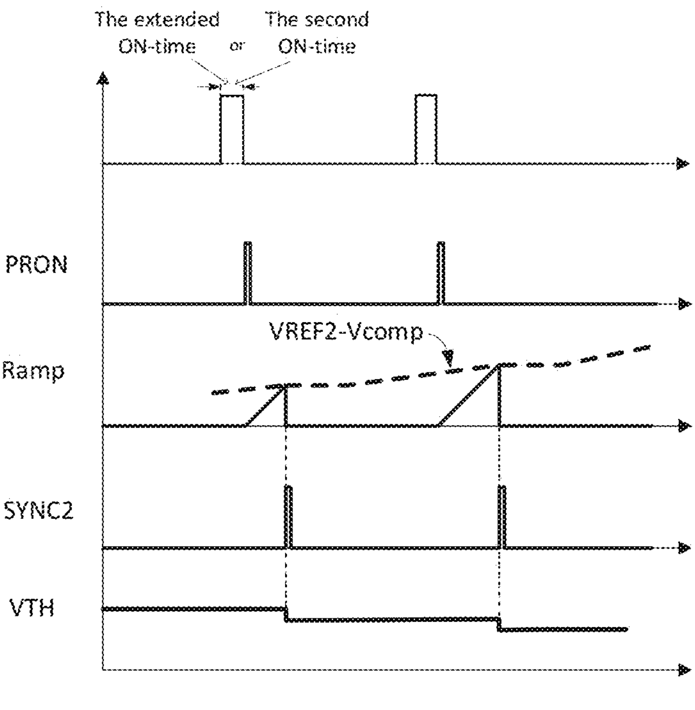

FIG. 8

100B
Vin
T
Vo
Cin
Co
20
10
ZCD
PDrv
SDrv
SRD
VZCD
CTRLP
109
Second Comparison Circuit
108
Threshold Voltage Generator
VTH
SYNC2
Isolation Circuit
PL
107
Pulse Signal Generator
VSRD
VREF
FB
Zero Cross Detection Circuit
ZCDS
Primary Logic Circuit
Observation Window Setting Circuit
SYNC1
PRON
Gate Driver
MD
Mode Judgement Circuit
Error Amplifying Circuit
105
106
110
104A
103
102
101
Vcomp
COMP
Rc
Cc
30
PGND
SGND

FIG. 9

ISOLATED SWITCHING CONVERTER WITH CONTINUOUS CONDUCTION MODE AND DISCONTINUOUS CONDUCTION MODE

CROSS-REFERENCE TO RELATED APPLICATIONS

This application claims the benefit of CN application No. 202311135328.X, filed on Sep. 4, 2023, and incorporated herein by reference.

TECHNICAL FIELD OF THE INVENTION

The present invention generally relates to electronic circuits, and more particularly but not exclusively, to isolated switching converters with continuous conduction mode (CCM) and discontinuous conduction mode (DCM) with a secondary side regulation and associated control methods.

BACKGROUND OF THE INVENTION

Isolated switching converters usually include a transformer with a primary winding and a secondary winding. A primary switch is coupled to the primary winding, and controls the energy stored in the primary winding to transfer to the secondary winding. An input voltage is received at a primary side of the transformer. A synchronous rectification is used as a trending technology for improving efficiency by replacing a rectifying diode at a secondary side with a secondary switch. The isolated switching converter operating in a discontinuous conduction mode can be designed to achieve zero-voltage switching of the primary switch for high efficiency and low power loss.

However, some functions, such as paper scrolling function of a printer that requires use of a motor, have a high power demand. Therefore, it is desired to provide an improved isolated switching converter that can achieve zero-voltage switching of the primary switch and meet the high power demand.

SUMMARY OF THE INVENTION

An embodiment of the present invention discloses a controller for an isolated switching converter with a transformer, a primary switch and a secondary switch. The controller comprises an error amplifying circuit, a mode judgement circuit and a gate driver. The error amplifying circuit is configured to provide a compensation signal based on an output feedback signal indicative of an output signal of the isolated switching converter and a reference voltage. The mode judgement circuit is configured to provide a mode signal to determine a first drive mode or a second drive mode based on a first voltage across the secondary switch and the compensation signal. The mode signal has a first level indicating the first drive mode and a second level indicating the second drive mode. The gate driver is configured for being switchable in the first drive mode and the second drive mode to provide a gate voltage for controlling the secondary switch. In the first drive mode, the secondary switch is turned on for a second ON-time after a current flowing through the secondary switch crosses zero. And in the second drive mode, the ON-state of the secondary switch is extended for an extended ON-time.

Another embodiment of the present invention discloses an isolated switching converter. The isolated switching converter comprises a transformer having a primary winding and a secondary winding, a primary switch coupled to the primary winding, a secondary switch coupled to the secondary winding, and a controller. The controller comprises an error amplifying circuit, a mode judgement circuit and a gate driver. The error amplifying circuit is configured to provide a compensation signal based on an output feedback signal indicative of an output signal of the isolated switching converter and a reference voltage. The mode judgement circuit is configured to provide a mode signal to determine a first drive mode or a second drive mode based on a first voltage across the secondary switch and the compensation signa. The mode signal has a first level indicating the first drive mode and a second level indicating the second drive mode. The gate driver is configured for being switchable in the first drive mode and the second drive mode to provide a gate voltage for controlling the secondary switch. In the first drive mode, the secondary switch is turned on for a second ON-time after a current flowing through the secondary switch crosses zero. And in the second drive mode, the ON-state of the secondary switch is extended for an extended ON-time.

Yet another embodiment of the present invention discloses a control method for an isolated switching converter. The isolated switching converter has a primary switch coupled to a primary winding of a transformer, a secondary switch coupled to a secondary winding of the transformer. The control method comprises the following steps. A compensation signal is provided based on a difference between an output feedback signal representative of an output signal of the isolated switching converter and a reference voltage. A mode signal is provided to determine a first drive mode or a second drive mode based on a first voltage across the secondary switch and the compensation signal. The secondary switch is turned on for a second ON-time after a current flowing through the secondary switch decreases to zero in the first drive mode. The ON-state of the secondary switch is extended for an extended ON-time in the second drive mode.

BRIEF DESCRIPTION OF DRAWINGS

The present invention can be further understood with reference to the following detailed description and the appended drawings, wherein like elements are provided with like reference numerals.

FIG. 8 shows working waveform diagram of the isolated switching converter 100A in accordance with an embodiment of the present invention.

FIG. 9 shows a schematic diagram of an isolated switching converter 100B in accordance with an embodiment of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element.

The present invention can be used in any isolated switching converter. In the following detailed description, for the sake of brevity, only a flyback converter is taken as an example to explain and describe the working principle of the present invention.

Figure 1:
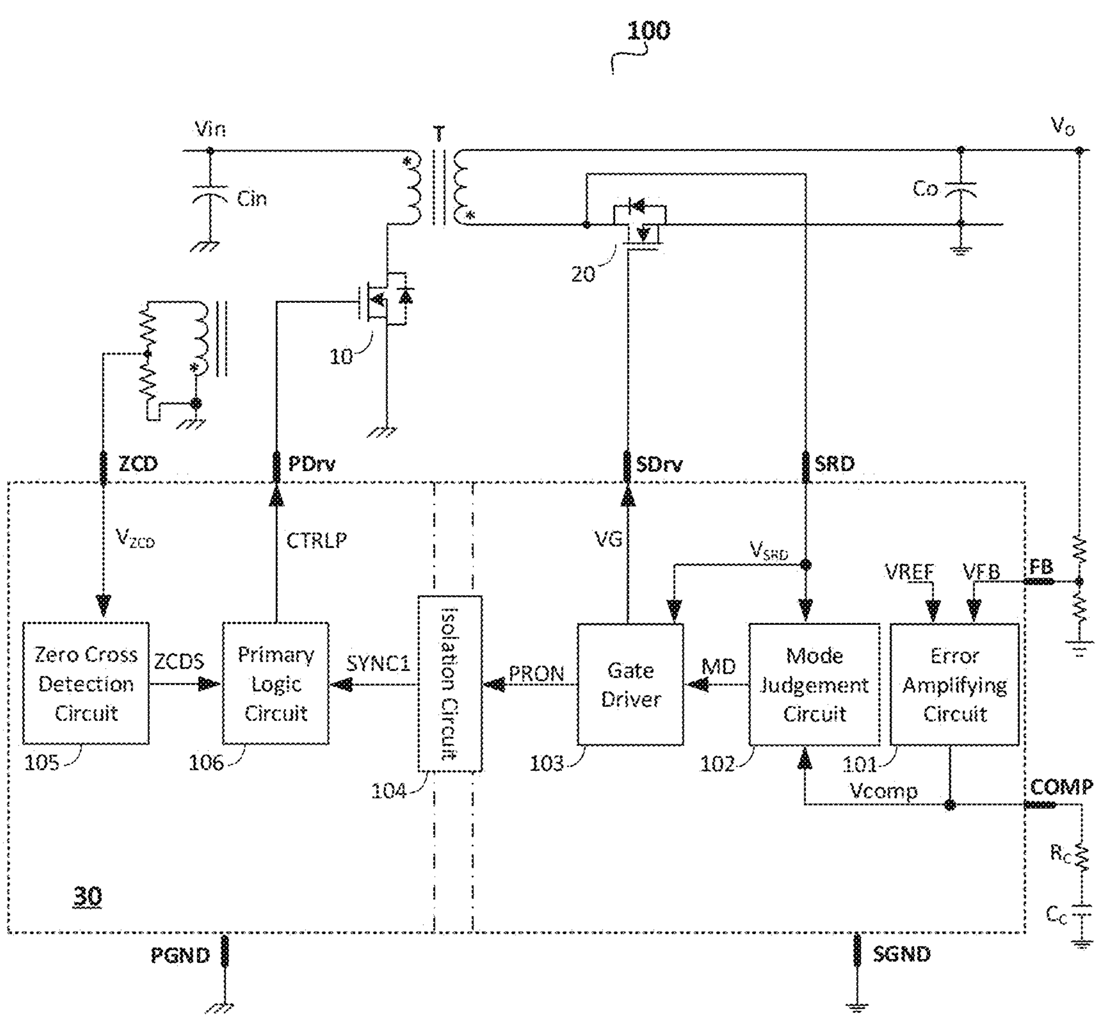
FIG. 1 shows a block diagram of an isolated switching converter 100 in accordance with an embodiment of the present invention.

FIG. 1 shows a block diagram of an isolated switching converter 100 in accordance with an embodiment of the present invention. As shown in FIG. 1, the isolated switching converter 100 comprises a transformer T, a primary switch 10, a secondary switch 20 and a controller 30. The transformer T for providing isolation between a primary side and a secondary side, and has a primary winding, a secondary winding and an auxiliary winding. The primary winding and the secondary winding both have a first terminal and a second terminal. The first terminal of the primary winding receives an input voltage Vin, the first terminal of the secondary winding provides a DC output voltage Vo, and the second terminal of the secondary winding is coupled to a secondary reference ground. The primary switch 10 is coupled between the second terminal of the primary winding and a primary reference ground. The secondary switch 20 is coupled between the second terminal of the secondary winding and a load. However, those skilled in the art should know that the secondary switch 20 may also be coupled between the first terminal of the secondary winding and the load.

As shown in FIG. 1, the controller 30 comprises an error amplifying circuit 101, a mode judgement circuit 102, a gate driver 103, an isolation circuit 104, a zero cross detection circuit 105 and a primary logic circuit 106. In one embodiment, the controller 30 could be a monolithic integrated circuit. In another embodiment, the controller 30 as well as the secondary switch are integrated in a monolithic integrated circuit.

In the embodiment shown in FIG. 1, the controller 30 of the isolated switching converter 100 is configured to operate in a continuous conduction mode (CCM) or a discontinuous conduction mode (DCM).

If the isolated switching converter 100 operates in DCM with quasi-resonant control, after a current flowing through an energy storage component (e.g., the transformer T) decrease to zero, the energy storage component resonates with a parasitic capacitance of the primary switch 10 during an OFF state of the secondary switch 20, and a resonant voltage (i.e., a voltage drop across the secondary switch 20 with one or more valleys during the OFF state of the secondary switch 20) is generated accordingly. The primary switch 10 can configured to be turned on with zero-voltage turning-on technique. In detail, before the primary switch 10 is turned on at zero voltage, the secondary switch 20 is turned on twice. In a further detail, after the primary switch 10 is turned off, the secondary switch 20 is turned on for a first time. And the secondary switch 20 is turned on for a first ON-time. When a current flowing through the secondary switch 20 decreases to cross zero at an end point of the first ON-time, the secondary switch 20 is turned off. This is a first switching of the secondary switch 20. Subsequently, the secondary switch 20 will be turned on again for a second ON-time, to generate a negative current flowing through the magnetized inductance of the transformer T. This negative current is used to discharge the parasitic capacitance of the primary switch 10 during the second ON-time of the secondary switch 20. At an end point of the second ON-time, the secondary switch 20 is turned off again. After that, the primary switch 10 is turned on to achieve zero-voltage turning-on of the primary switch 10, and to reduce the switching loss and electromatic inference.

If the isolated switching converter operates in CCM, firstly, the secondary switch 20 is turned on after the primary switch 10 is turned off. The secondary switch 20 is turned on for the first ON-time based on the circuit operation under CCM. And then before the current flowing through the secondary switch 20 decrease to crosse zero, the secondary switch 20 is not turned off after the first ON-time, the ON-state of the secondary switch 20 is extended for an additional extended ON-time. In other words, the secondary switch 20 is turned off until an end point of the additional extended ON-time. After that, the primary switch 10 is turned on to achieve partially zero-voltage turning-on of the primary switch 10. In this way, the zero-voltage turning-on of the primary switch 10 can also be achieved in some situations and more power can be provided by the isolated switching converter 100.

In the embodiment shown in FIG. 1, the controller 30 is an integrated circuit having a plurality of pins. The plurality of pins comprises an output feedback pin FB, a compensation pin COMP, a secondary reference ground pin SGND, a drain terminal sense pin SRD, a secondary drive pin SDrv, a voltage zero-crossing sense pin ZCD, a primary control pin PDrv and a primary reference ground pin PGND.

In the embodiment shown in FIG. 1, the error amplifying circuit 101 has a first input terminal, a second input terminal and an output terminal. The first input terminal of the error amplifying circuit 101 is coupled to the output feedback pin FB to receive an output feedback signal VFB indicative of an output signal (e.g., an output voltage Vo) of the isolated switching converter 100. The second input terminal of the error amplifying circuit 101 is configured to receive a reference voltage VREF. The output terminal is coupled to the compensation pin COMP. The error amplifying circuit 101 is configured to provide a compensation signal VCOMP at the output terminal based on the difference between the output feedback signal VFB and the reference voltage VREF.

The mode judgement circuit 102 is coupled to the drain terminal sense pin SRD to receive a drain terminal voltage VSRD of the secondary switch 20, and further is coupled to the output terminal of the error amplifying circuit 101 to receive the compensation signal Vcomp. In the embodiment shown in FIG. 1, the drain terminal voltage VSRD can represent a voltage across the secondary switch 20. Bases on valleys of the voltage across the secondary switch 20 and the compensation signal Vcomp, the mode judgement circuit 102 is configured to provide a mode signal MD, to determine a first drive mode or a second drive mode. The mode signal MD has a first level indicating the first drive mode and the second level indicating the second drive mode.

In one embodiment, when a valley number of the valleys of the voltage across the secondary switch 20 is zero, and the compensation signal Vcomp is greater than a first threshold voltage Vth1, the mode signal MD becomes the second level from the first level. When the valley number of the valleys of the voltage across the secondary switch 20 is increased to 1 from 0, or the compensation signal Vcomp is less than a second threshold voltage Vth2, the mode signal MD becomes the first level from the second level, wherein the first threshold voltage Vth1 is greater than the second threshold voltage Vth2.

The gate driver 103 is configured to provide a gate voltage for controlling the secondary switch 20. The gate driver 103 is configured for being switchable to operate between the first drive mode and the second drive mode. When the gate driver 103 operates in the first drive mode, the secondary switch 20 is turned on for a first ON-time when the current flowing through the secondary switch 20 crosses zero, and after the current flowing through the secondary switch 20 crosses zero, the secondary switch 20 is turned on for a second ON-time. When the gate driver 103 operates in the second drive mode, firstly, the secondary switch 20 is turned on for the first ON-time before the current flowing through the secondary switch 20 crosses zero, and then the ON-state of the secondary switch 20 is kept and is extended for an additional extended ON-time after the first ON-time. A primary ON enable signal PRON is provided and activated at an end point of the second ON-time in DCM, or at an end point of the extended ON-time in CCM. It should be noted that the first ON-time of the secondary switch 20 in the first drive mode and the second drive mode are not equal. The first ON-time of the secondary switch 20 in the first drive mode is determined in response to the current crossing zero. However, the first ON-time of the secondary switch 20 in the second drive mode is not related the time of the current crossing zero, is controlled by the circuit operation in CCM.

The isolation circuit 104 has a first channel for transmitting the primary on enable signal PRON. The isolation circuit 104 has a first input terminal and a first output terminal. The first input terminal of the isolation circuit 104 is configured to receive the primary on enable PRON. The isolation circuit 104 provides a first synchronous signal SYNC1 electrically from the primary on enable signal PRON.

The zero cross detection circuit 105 is configured to provide a voltage zero-crossing detection signal ZCDS by detecting whether a voltage across the primary switch 10 crosses zero. In the embodiment shown in FIG. 1, the isolated switching converter 100 further comprises an auxiliary winding located at the primary side of the transformer T, the auxiliary winding is coupled to the voltage zero-crossing sense pin ZCD of the controller 30 via a voltage divider. The zero cross detection circuit 105 is configured to receive a voltage detection signal $V_{ZCD}$ representative of a voltage $V_{Pri\_DS}$ across the primary switch 10. The zero cross detection circuit 105 compares the voltage detection signal $V_{ZCD}$ with a zero-crossing threshold voltage and provides the voltage zero-crossing detection signal ZCDS at the output terminal based on the comparison. In one embodiment, the zero-crossing threshold voltage is 20 mV. In other embodiments, the zero cross detection circuit 105 can also include additional and/or different circuit components.

The primary logic circuit 106 is coupled to the first output terminal of the isolation circuit 104 to receive the first synchronous signal SYNC1. The primary logic circuit 106 provides a primary control signal CTRLP to a primary control pin PDrv for controlling the primary switch 10, based on the first synchronous signal SYNC1 and the voltage zero-crossing detection signal ZCDS.

Figures 2, 3:
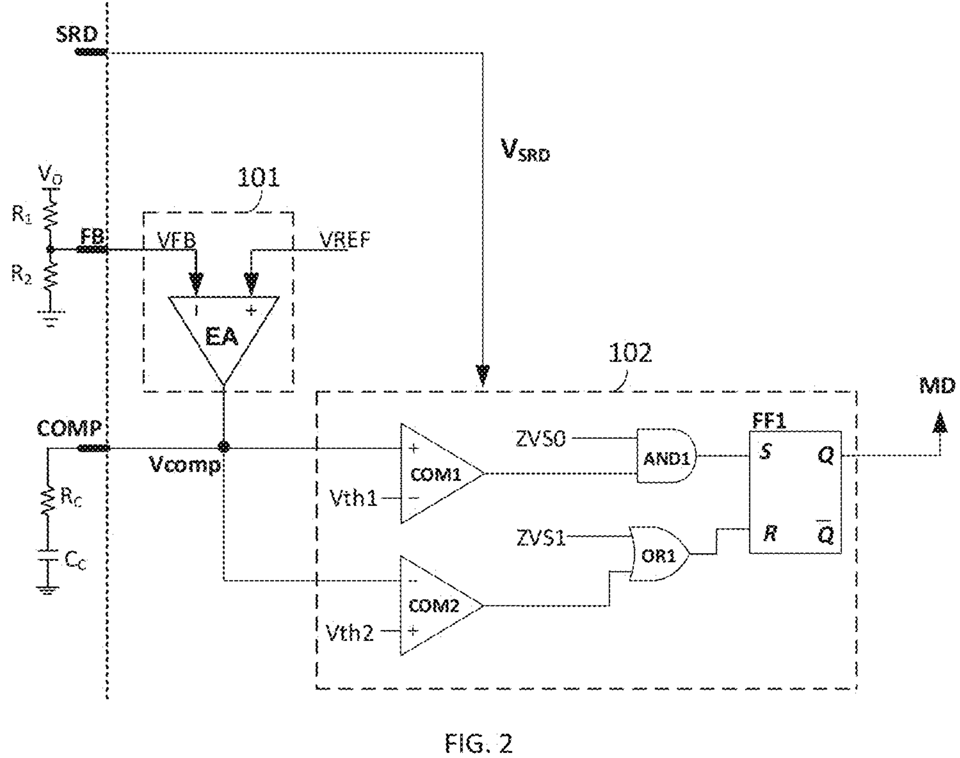
FIG. 2 shows a schematic diagram of an error amplifying circuit 101 and a mode judgement circuit 102 in accordance with an embodiment of the present invention.
FIG. 3 shows working waveform diagram of the circuits shown in FIG. 2 in accordance with an embodiment of the present invention.

FIG. 2 shows a schematic diagram of an error amplifying circuit 101 and a mode judgement circuit 102 in accordance with an embodiment of the present invention.

In the embodiment shown in FIG. 2, the error amplifying circuit 101 comprises an error amplifier EA. The inverting input terminal of the error amplifier EA is configured to receive the output feedback signal VFB, the non-inverting input terminal of the error amplifier EA is configured to receive the reference voltage VREF, the output terminal is configured to provide the compensation signal Vcomp at the compensation pin COMP.

As shown in FIG. 2, the mode judgement circuit 102 comprises a first comparator COM1, the second comparators COM2, and an AND gate circuit AND1, an OR gate circuit OR1 and a flip-flop FF1. "ZVS1" indicates that the valley number of the valleys of the voltage across the secondary switch 20 is 1, i.e., the first valley shows. "ZVS0" indicates that the valley number of the valleys of the voltage across the secondary switch 20 is 0. When the compensation signal Vcomp is greater than the first threshold voltage Vth1 and the valley number of the voltage across the secondary switch 20 is zero, the mode signal MD becomes the second level, the gate driver 103 operates in the second drive mode. When the compensation signal Vcomp is less than the second threshold voltage Vth2 or the valley number of the voltage across the secondary switch 20 is 1, the mode signal MD becomes the first level, the gate driver 103 operates in the first drive mode.

FIG. 3 shows working waveform diagram of the circuits shown in FIG. 2 in accordance with an embodiment of the present invention. In detail, FIG. 3 shows working waveforms of the voltage across the secondary switch 20 (e.g., the drain terminal voltage VSRD shown in FIG. 2) and the compensation signal Vcomp. "ZVS1" indicates that the valley number of the voltage across the secondary switch 20 is 1. "ZVS0" indicates that the valley number of the voltage across the secondary switch 20 is 0. When the valley number becomes ZVS0 from ZVS1, and the compensation signal Vcomp increases to the first threshold voltage Vth1, the mode signal MD becomes the second level, the gate driver 103 switches to the second drive mode. When the valley number becomes ZVS1 from ZVS0, or the compensation signal Vcomp decreases to the second threshold voltage Vth2, the mode signal MD becomes the first level from the second level, the gate driver 103 switches to the first drive mode.

Figure 4:
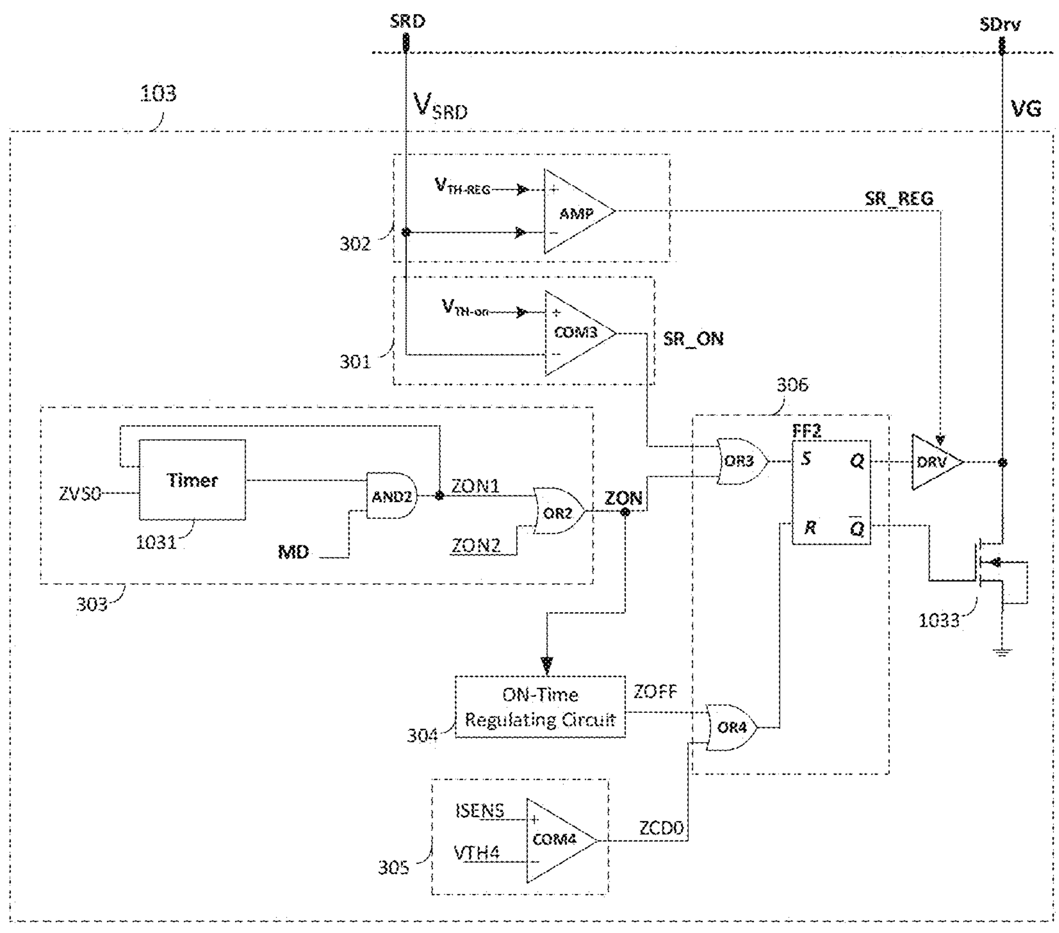
FIG. 4 shows a schematic diagram of a gate driver 103 in accordance with an embodiment of the present invention.

FIG. 4 shows a schematic diagram of a gate driver 103 in accordance with an embodiment of the present invention. In the embodiment shown in FIG. 4, the gate driver 103 comprises a primary off detection circuit 301, a gate regulation circuit 302, an ON control circuit 303, an ON-time regulating circuit 304, a current zero-crossing detection circuit 305, a secondary logic circuit 306, a driving circuit DRV and a discharge switch 1033.

In the example shown in FIG. 4, the primary off detection circuit 301 is configured to detect if the primary switch 10 is off and to provide a primary off detection signal SR_ON. In the embodiment shown in FIG. 4, the primary off detection circuit 301 detects whether the primary switch 10 is off based on the drain terminal voltage VSRD of the secondary switch 20. In other embodiments, the primary off detection circuit 301 detects whether the primary switch 10 is off based on the current flowing though the secondary switch 20 or a voltage across the secondary winding and so on. The primary off detection circuit 301 may also receive signals indicating whether the primary switch 10 is off from the primary side. The primary off detection circuit 301 also can obtain signals from the primary side to determine whether the primary switch 10 is off.

In the example shown in FIG. 4, the primary off detection circuit 301 comprises a comparator COM3. The non-inverting input terminal of the comparator COM3 is configured to receive a turning on threshold voltage $V_{TH\_ON}$, the inverting input terminal of the comparator COM3 is configured to receive the drain terminal voltage VSRD of the secondary switch 20, the output terminal is configured to provide the primary off detection signal SR_ON. The secondary switch 20 is turned on with a normal maximum gate voltage VG when the turning-off of the primary switch 10 is detected. And an ON resistance of the secondary switch 20 is kept in a minimum value in a first time interval of the first drive mode or in a first time interval of the second drive mode.

The gate regulation circuit 302 is configured to pull down the gate voltage VG of the secondary switch 20 to increase an ON resistance of the secondary switch 20, in a second time interval of the first drive mode or in a second time interval of the second drive mode. In the embodiment shown in FIG. 4, the gate regulation circuit 302 comprises an amplifier AMP. The inverting input terminal of the amplifier AMP is configured to receive the drain terminal voltage VSRD of the secondary switch 20, the non-inverting input terminal of the amplifier AMP is configured to receive a regulating threshold voltage $V_{TH\_REG}$. The amplifier AMP provides a gate regulation signal SR_REG at an output terminal.

The ON control circuit 303 is configured to provide an ON control signal ZON for controlling the second turning-on of the secondary switch 20, or controlling the extended turning-on of the secondary switch 20. In the embodiment shown in FIG. 4, the ON control circuit 303 comprises a timer circuit 1031, an AND gate circuit AND2, and an OR gate circuit OR2.

The timer circuit 1031 is configured to provide a predetermined time threshold TS. The AND gate circuit AND2 has a first input terminal coupled to the timer circuit 1031, a second input terminal coupled to the mode judgement circuit 102 and an output terminal configured to provide an extending ON control signal ZON1. When the timing duration of the timer circuit 1031 reaches the predetermined time threshold TS, and the current flowing through the secondary switch 20 is still higher than zero, the extending ON control signal ZON1 provided by the AND gate circuit AND2 is activated, and the ON-state of the secondary switch 20 is kept and extended.

In one embodiment, the ON control circuit 303 comprises a quasi-resonant control circuit (not shown). The quasi-resonant control circuit is coupled to the secondary switch 20 to detect a resonant voltage of the isolated switching converter 100 and is configured to provide a second ON control signal ZON2 at a target valley of the resonant voltage. When the valley number of the valleys of the voltage across the secondary switch 20 is equal to the target valley number, the second ON control signal ZON2 is activated, and the secondary switch 20 is turned on for a second time.

The OR gate circuit OR2 receives the extending ON control signal ZON1 and the second ON control signal ZON2, provides the ON control signal ZON at an output terminal. In the example shown in FIG. 4, when the extending ON control signal ZON1 is activated or the second ON control signal ZON2 is activated, the ON control signal ZON is activated.

The ON-time regulating circuit 304 receives the ON control signal ZON, is configured to provide an OFF control signal at an output terminal for controlling the extended ON-time or the second ON-time of the secondary switch 20, based on the drain terminal voltage VSRD of the secondary switch 20, the output voltage Vo and the resistance of an external resistor outside of the controller 30.

The current zero-crossing detection circuit 305 is configured to detect whether the current flowing through the secondary switch 20 crosses zero and generate a zero-crossing detection signal ZCD0. In the example shown in FIG. 4, the current zero-crossing detection circuit 305 comprises a comparator COM4. The inverting terminal of the comparator COM4 is configured to receive a threshold voltage VTH4. The non-inverting terminal of the comparator COM4 is configured to receive a current sense signal ISENS indicative of the current flowing through the secondary switch 20. The zero-crossing detection signal ZCD0 is provided at an output terminal of the comparator COM4.

The secondary logic circuit 306 is configured to control the turning-on and turning-off of the secondary switch 20 based on the primary off detection signal SR_ON, the ON control signal ZON, the zero-crossing detection signal ZCD0 and the OFF control signal ZOFF. In the example shown in FIG. 4, the secondary logic circuit 306 comprises OR gate circuits OR3 and OR4, and a flip-flop FF2. In detail, when the primary off detection signal SR_ON is activated, the secondary switch 20 is turned on for a first time. When the drain terminal voltage VSRD of the secondary switch 20 is increased to reach the regulating threshold voltage $V_{TH\_REG}$, the driving circuit DRV pulls down the gate voltage VG of the secondary switch 20 to reduce the ON-resistance of the secondary switch 20. When the ON control signal ZON is activated, the secondary switch 20 is turned on for the second time or the ON-state of the secondary switch 20 is extended, which depends on the drive mode of the gate driver 103. When the OFF control signal ZOFF is activated, or the zero-crossing detection signal ZCD0 is activated, the discharge switch 1033 is turned on for pulling the gate voltage VG of the secondary switch 20 down to zero, and the secondary switch 20 is turned off. The secondary logic circuit 306 is further configured to provide the primary on enable signal PRON at the end point of the second-ON-time or at the end point of the extended ON-time.

Figure 5:
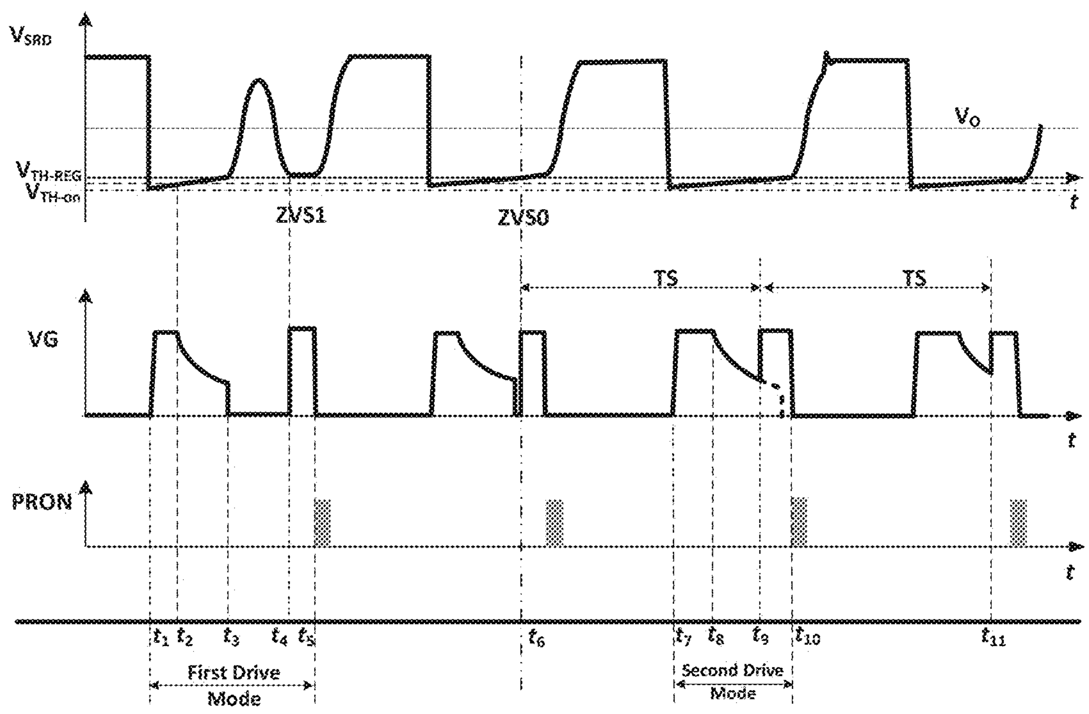
FIG. 5 shows working waveform diagram of the gate driver 103 shown in FIG. 4 in accordance with an embodiment of the present invention.

FIG. 5 shows working waveform diagram of the gate driver 103 shown in FIG. 4 in accordance with an embodiment of the present invention. As shown in FIG. 5, before time t6, the gate driver 103 operates in the first drive mode. After time t6, the gate driver 103 operates in the second drive mode.

In detail, when the gate driver 103 operates in the first drive mode, in a first time interval (e.g., t1~t2) of the first drive mode, the gate driver 103 controls the gate voltage VG of the secondary switch 20 to be a maximum normal voltage and thus the secondary switch 20 has a minimum ON-resistance. In a second time interval (t2~t3) of the first drive mode, the gate voltage VG of the secondary switch 20 is pulled down to higher than zero and less the normal voltage, to increase the ON-resistance of the secondary switch 20. In a third time interval (t3~t4) of the first drive mode, the gate voltage VG of the secondary switch 20 is kept to substantially zero, the secondary switch 20 is in an OFF-state. In a fourth time interval (t4~t5) of the first drive mode, the valley number of the valleys of the voltage across the secondary switch 20 is 1 and is equal to the target valley number (ZVS1), the secondary switch 20 is turned on for the second time, the gate voltage VG of the secondary switch 20 is pulled up to the maximum voltage for the second ON-time. The second ON-time of the secondary switch 20 is a time duration of the fourth time interval of the first drive mode and is controlled by the ON-time regulating circuit 304.

When the gate driver 103 operated in the second drive mode, in a first time interval (t7~t8) of the second drive mode, the gate driver 103 controls the gate voltage VG of the secondary switch 20 to be the maximum normal voltage and thus the secondary switch 20 has the minimum ON-resistance. In a second time interval (t8~t9) of the second drive mode, the gate voltage VG of the secondary switch 20 is pulled down, to increase the ON-resistance of the secondary switch 20. In a third time interval (t9~t10) of the second drive mode, the timing duration of the timer circuit 1031 reaches to the predetermined time threshold TS, the ON-state of the secondary switch 20 is extended, and the gate voltage VG of the secondary switch 20 is pulled up to the maximum normal voltage. At a start point of the third time interval, the current flowing through the secondary switch 20 is still higher than zero and not being zero. The extended ON-time of the secondary switch 20 is a time duration of the third time interval of the second drive mode and is also controlled by the ON-time regulating circuit 304.

In addition, the primary on enable signal PRON is provided at the end point of the second ON-time, or at the end point of the extended ON-time. In other words, when the secondary switch 20 is turned off at time t5 or at time t10, the primary on enable signal PRON is provided and activated.

Figure 6:
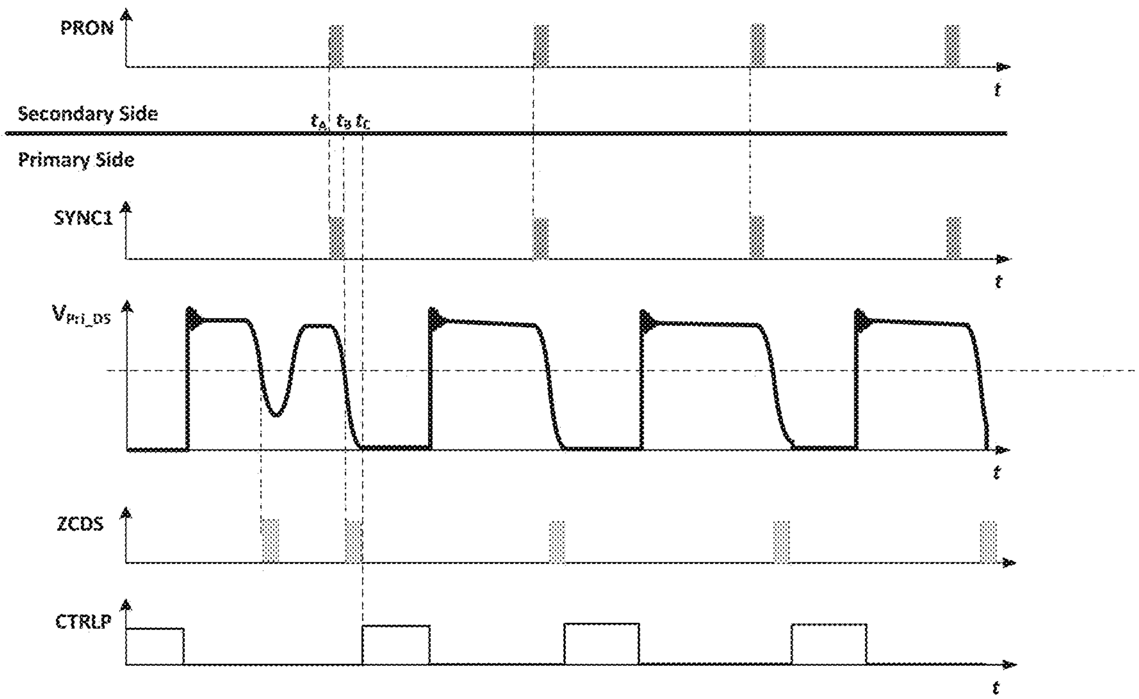
FIG. 6 shows working waveform diagram of the isolated switching converter 100 in accordance with an embodiment of the present invention.

FIG. 6 shows working waveform diagram of the isolated switching converter 100 in accordance with an embodiment of the present invention. As shown in FIG. 6, the primary on enable signal PRON is provided at the end point of the second ON-time or at the end point of the extended ON-time. When the primary on enable signal PRON is activated, a rising edge of the primary on enable signal PRON comes. Almost at the same time, the isolation circuit 104 provides, at the first output terminal, the first synchronous signal SYNC1 electrically isolated from the primary on enable signal PRON. As shown at time $t_A$, the first synchronous signal SYNC1 becomes a high level. At time $t_B$, the zero-crossing of the voltage across the auxiliary winding is detected by the zero-crossing detection circuit 105 and the voltage zero-crossing detection signal ZCDS is provided. After for a while, at time $t_C$, the primary control signal CTRLP becomes high level, and the primary switch 10 is turned on at zero voltage.

Figure 7:
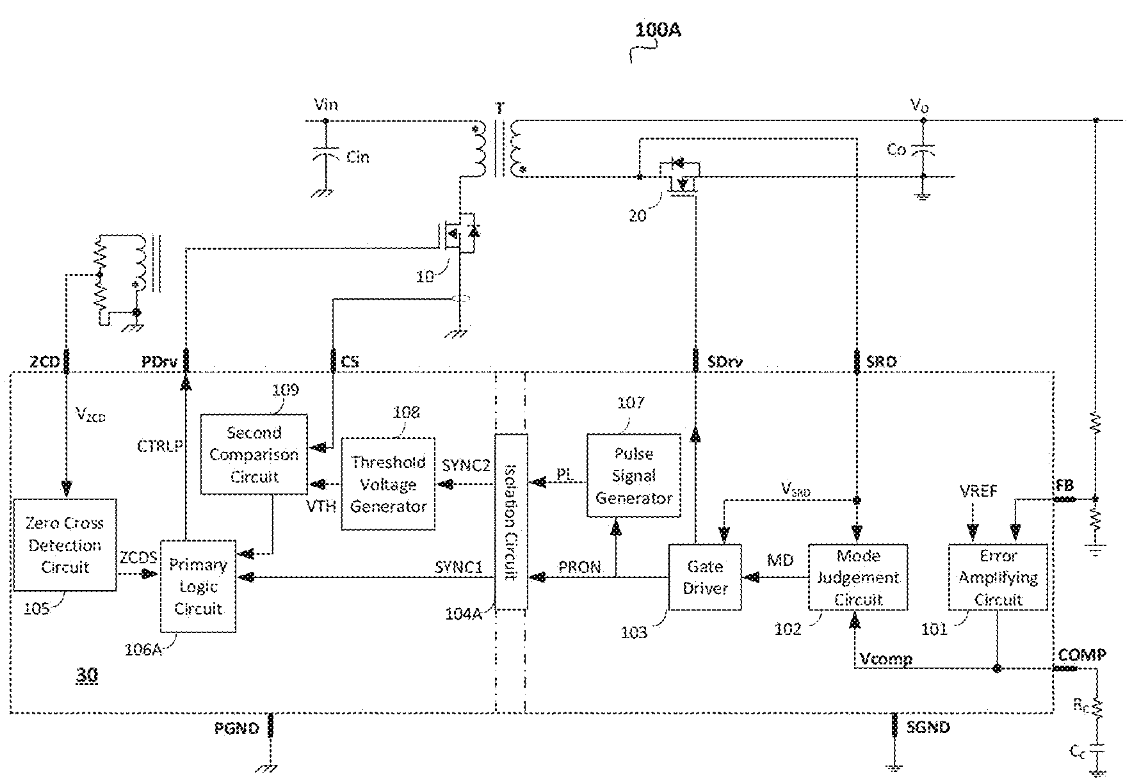
FIG. 7 shows a schematic diagram of an isolated switching converter 100A in accordance with an embodiment of the present invention.

FIG. 7 shows a schematic diagram of an isolated switching converter 100A in accordance with an embodiment of the present invention. Compared with the isolated switching converter 100 shown in FIG. 1, the isolated switching converter 100A shown in FIG. 7 further comprises a pulse signal generator 107, a threshold voltage generator 108 and a second comparison circuit 109. FIG. 8 shows working waveform diagram of the isolated switching converter 100A in accordance with an embodiment of the present invention.

In the example shown in FIG. 7, when the primary on enable signal PRON is activated, a ramp signal RAMP increases from zero with a predetermined slope. When the ramp signal RAMP is increased to reach a difference between a second reference voltage VREF2 and the compensation signal Vcomp, the pulse signal generator 107 provides a pulse signal PL, as shown in FIG. 8.

As shown in FIG. 7, the isolation circuit 104A further has a second channel for transmitting the pulse signal PL. The isolation circuit 104A has a second input terminal and a second output terminal. The second input terminal of the isolation circuit 104A receives the pulse signal PL. The isolation circuit 104A provides a second synchronous signal SYNC2 at the second output terminal. The second synchronous signal SYNC2 is electrically isolated from the pulse signal PL.

The threshold voltage generator 108 is coupled to the second output terminal of the isolation circuit 104A to receive the second synchronous signal SYNC2, provides a current threshold voltage VTH for controlling a peak current flowing through the primary switch 10 based on the second synchronous signal SYNC2. The second comparison circuit 109 compares a primary current sensing signal indicative of the current flowing through the primary switch 10 and the current threshold voltage VTH, and provides a second comparison signal at an output terminal. The primary logic circuit 106A controls the turning-off of the primary switch 10 based on the second comparison signal.

FIG. 9 shows a schematic diagram of an isolated switching converter 100B in accordance with an embodiment of the present invention. Compared with the embodiment shown in FIG. 7, the isolated switching converter 100B shown in FIG. 9 further comprises an observation window setting circuit 110.

The observation window setting circuit 110 is coupled to the first output terminal of the isolation circuit 104A to receive the first synchronous signal SYNC1 and sets an observation window $t_{ZCD-VW}$ based on the first synchronous signal SYNC1. The primary logic circuit 106A provides the primary control signal CTRLP based on the observation window $t_{ZCD-VW}$, the voltage zero-crossing detection signal ZCDS and the second comparison signal. When the crossing-zero of the voltage $V_{Pri\_DS}$ across the primary switch 10 is detected, the voltage zero-crossing detection signal ZCDS is activated, a time delay $t_{Delay}$ is provided. In one embodiment, if an end point of the time delay $t_{Delay}$ is within the observation window $t_{ZCD-VW}$, the primary switch 10 is turned on at the end point of the time delay $t_{Delay}$. In another embodiment, the primary switch 10 is turned on at the end point of the observation window $t_{ZCD-VW}$ if the end point of the time delay $t_{Delay}$ is outside the observation window $t_{ZCD-VW}$.

Figure 10:
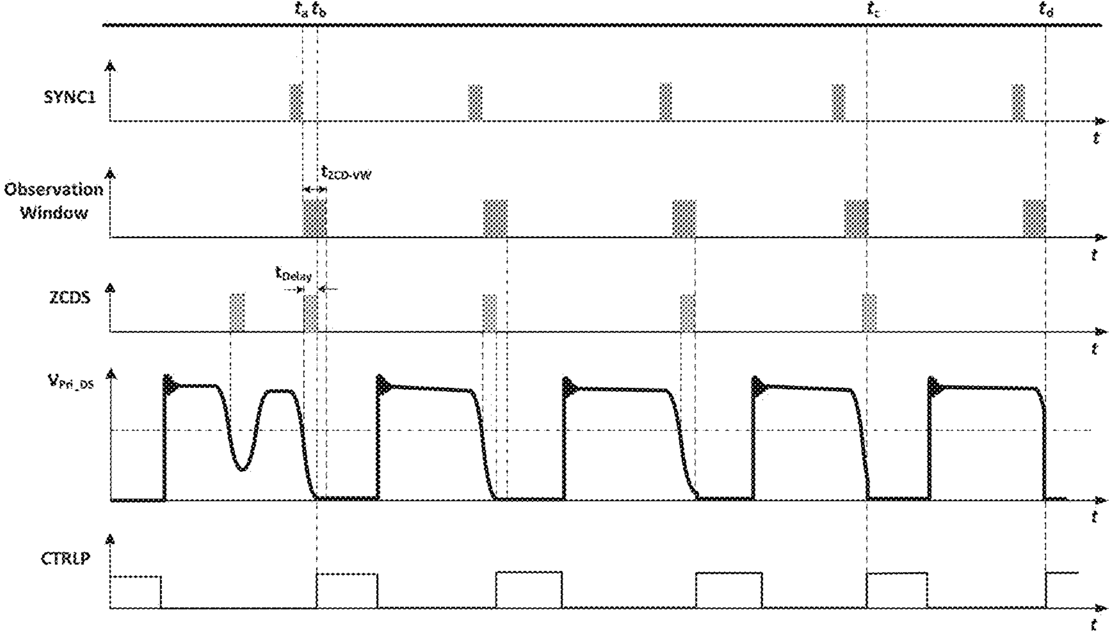
FIG. 10 shows working waveform diagram of the isolated switching converter 100B shown in FIG. 9 in accordance with an embodiment of the present invention.

FIG. 10 shows working waveform diagram of the isolated switching converter 100B shown in FIG. 9 in accordance with an embodiment of the present invention. As shown in FIG. 10, at time $t_a$, the voltage $V_{Pri\_DS}$ across the primary switch 10 crosses zero, and the voltage zero sensing signal ZCDS is activated. The end point of the time delay $t_{Delay}$ is the time instant $t_b$. Since the end point of the time delay $t_{Delay}$ is within the observation window $t_{ZCD-VW}$, the primary switch 10 is turned on at time $t_b$.

Referring still to FIG. 10, at time $t_c$, when the observation window $t_{ZCD-VW}$ ends, and the end point of the time delay $t_{Delay}$ is outside of the observation window $t_{ZCD-VW}$, the primary switch 10 is turned on at the end point of the observation window $t_{ZCD-VW}$. At time $t_a$, the zero-crossing of the voltage $V_{Pri\_DS}$ across the primary switch 10 is not detected, the primary switch 10 is also turned on at the end point of the observation window $t_{ZCD-VW}$.

Figure 11:
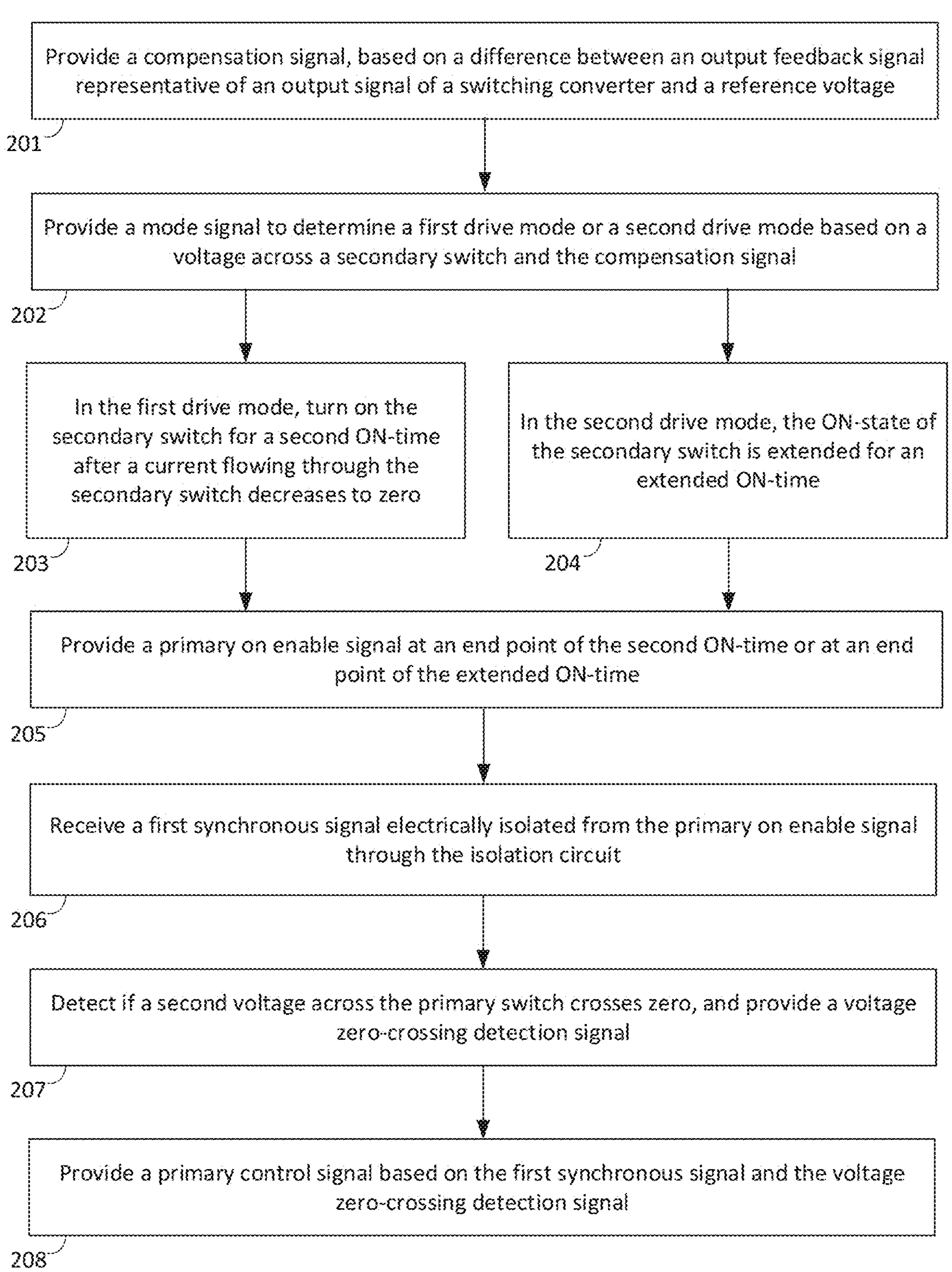
FIG. 11 shows a flow diagram of a control method 200 for an isolated switching converter in accordance with an embodiment of the present invention.

FIG. 11 shows a flow diagram of a control method 200 for an isolated switching converter in accordance with an embodiment of the present invention. The isolated switching converter comprises a transformer having a primary winding and a secondary winding, a primary switch coupled to the primary winding, a secondary switch coupled to the secondary winding, and an isolation circuit. The control method 200 comprises steps 201~204.

In step 201, a compensation signal is generated based on an output feedback signal representative of an output signal of the isolated switching converter and a reference voltage.

In step 202, a mode signal is provided to determine a first drive mode or a second drive mode based on a voltage across the secondary switch and the compensation signal.

In one embodiment, when a valley number of the voltage across the secondary switch is zero and the compensation signal is greater than a first threshold voltage, the mode signal becomes a second level. When the valley number increases from 0 to 1 or the compensation signal is less than a second threshold voltage, the mode signal becomes the first level from the second level. The first threshold voltage is higher than the second threshold voltage.

In step 203, in response to the first drive mode, the secondary switch is turned on for a second ON-time after a current flowing through the secondary switch crosses zero. In a first time interval of the first drive mode, a gate voltage of the secondary switch is controlled and kept to a maximum normal voltage. In a second time interval of the first drive mode, the gate voltage of the secondary switch is pulled down and regulated. In a third time interval of the first drive mode, the gate voltage of the secondary switch is kept to substantially zero. In a fourth time interval of the first drive mode, the secondary switch is turned on for the second ON-time, and the gate voltage of the secondary switch is pulled up and kept to the maximum normal voltage during the second ON-time.

In step 204, in response to the second drive mode, the ON-state of the secondary switch is kept and extended. In a first time interval of the second drive mode, the gate voltage of the secondary switch is controlled and kept to the maximum normal voltage. In a second time interval of the second drive mode, the gate voltage of the secondary switch is pulled down and regulated. In a third time interval of the second drive mode, the ON-state of the secondary switch is extended, and the gate voltage of the secondary switch is pulled up and kept to the maximum normal voltage.

In one embodiment, the control method 200 further comprises steps 205~208. In step 205, a primary on enable signal is provided at an end point of the second ON-time or at an end point of the extended ON-time.

In step 206, the primary ON enable signal is sent to a first channel of the isolation circuit and a first synchronous signal electrically isolated from the primary on enable signal through the isolation circuit.

In step 207, a voltage zero-crossing detection signal is provided by detecting if a voltage across the primary switch crosses zero.

In step 208, a primary control signal is provided based on the first synchronous signal and the voltage zero-crossing detection signal, to control the primary switch.

In one embodiment, the control method 200 further comprises: starting timing in response to a valley number of the voltage across the secondary switch being 0, if the current flowing through the secondary switch is still higher than zero when the timing duration reaches a predetermined time threshold, the ON-state of the secondary switch is extended for an additional extended ON-time.

In another embodiment, starting timing at a start point of the extended ON-time in a last switching cycle, if the current flowing through the secondary switch is still higher than zero when the timing duration reaches the predetermined time threshold, the ON-state of the secondary switch is extended again in the current switching cycle.

In another embodiment, the control method 200 further comprises: setting an observation window based on the first synchronous signal, providing a time delay when detecting a zero-crossing of the voltage across the primary switch. In one embodiment, if an end point of the time delay is within the observation window, the primary switch is turned on at the end point of the time delay. In another embodiment, if the end point of the time delay is outside from the observation window, the primary switch is turned on at an end point of the observation window.

In one embodiment, the method 200 further comprises the method of generating a current threshold voltage to limit the peak current of the current flowing through the primary switch. At the secondary side, a ramp signal is increased from zero with a predetermined slope when the primary on enable signal is activated. A pulse signal is provided when the ramp signal increases to a difference between the second reference voltage and the compensation signal. The pulse signal is provided to a second channel of the isolation circuit for providing a second synchronous signal electrically isolated from the pulse signal. Th current threshold voltage is provided based on the second synchronous signal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Obviously, many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A controller for an isolated switching converter with a transformer, a primary switch and a secondary switch, the controller comprising:

an error amplifying circuit configured to provide a compensation signal based on an output feedback signal indicative of an output signal of the isolated switching converter and a reference voltage;

a mode judgement circuit configured to provide a mode signal to determine a first drive mode or a second drive mode based on a first voltage across the secondary switch and the compensation signal, and the mode signal has a first level indicating the first drive mode and a second level indicating the second drive mode; and a gate driver configured for being switchable in the first drive mode and the second drive mode to provide a gate voltage for controlling the secondary switch, wherein in the first drive mode, the secondary switch is turned on for a second ON-time after a current flowing through the secondary switch crosses zero, and in the second drive mode, the ON-state of the secondary switch is extended for an extended ON-time.

2. The controller of claim 1, wherein:

if a valley number of the first voltage across the secondary switch is zero and the compensation signal is higher than a first threshold voltage, the mode signal becomes the second level;

if the valley number of the first voltage across the secondary switch is higher than zero, the mode signal becomes the first level; and if the compensation signal is less than a second threshold voltage, the mode signal becomes the first level, wherein the first threshold voltage is higher than the second threshold voltage.

3. The controller of claim 1, wherein in the first drive mode:

in a first time interval, the gate voltage of the secondary switch is controlled and is kept at a third voltage;

in a second time interval, the gate voltage of the secondary switch is pulled down;

in a third time interval, the gate voltage of the secondary switch is substantially zero; and in a fourth time interval, the gate voltage of the secondary switch is pulled high to the third voltage.

4. The controller of claim 1, wherein in the second drive mode:

in a first time interval, the gate voltage of the secondary switch is controlled and is kept at a third voltage;

in a second time interval, the gate voltage of the secondary switch is pulled down; and in a third time interval, the gate voltage of the secondary switch is pulled high to the third voltage.

5. The controller of claim 1, wherein the gate driver comprising:

a timer circuit configured to start timing in response to a valley number of the first voltage across the secondary switch being zero, if the timing duration of the timer circuit reaches a time threshold and the current flowing through the secondary switch is still higher than zero, the ON-state of the secondary switch is extended.

6. The controller of claim 1, wherein the gate driver is configured to provide a primary on enable signal at an end point of the second ON-time or at an end point of the extended ON-time, and the controller further comprising:

an isolation circuit having a first input terminal to receive the primary on enable signal and a first output terminal for outputting a first synchronous signal electrically isolated from the primary on enable signal;

a zero cross detection circuit configured to provide a voltage zero-crossing detection signal by detecting whether a second voltage across the primary switch crosses zero; and a primary logic circuit configured to provide a primary control signal for controlling the primary switch based on the first synchronous signal and the voltage zero-crossing detection signal.

7. The controller of claim 6, further comprising:

an observation window setting circuit configured to receive the first synchronous signal and to provide an observation window based on the first synchronous signal;

a second comparison circuit configured to compare a primary current sensing signal representative of a current flowing through the primary switch with a current threshold voltage, and to provide a second comparison signal; and wherein the primary logic circuit provides the primary control signal based on the observation window, the voltage zero-crossing detection signal and the second comparison signal.

8. The controller of claim 6, further comprising:

a pulse signal generator configured to provide a pulse signal when a ramp signal increases to a difference between a second reference voltage and the compensation signal, wherein the ramp signal increases from zero with a slope when the primary on enable signal is activated;

the isolation circuit further has a second input terminal to receive the pulse signal and a second output terminal for outputting a second synchronous signal electrically isolated from the pulse signal; and a threshold voltage generator coupled to the second output terminal of the isolation circuit to receive the second synchronous signal and configured to provide a current threshold voltage based on the second synchronous signal.

9. An isolated switching converter, comprising:

a transformer having a primary winding and a secondary winding;

a primary switch coupled to the primary winding;

a secondary switch coupled to the secondary winding; and a controller, comprising:

an error amplifying circuit configured to provide a compensation signal based on an output feedback signal indicative of an output signal of the isolated switching converter and a reference voltage;

a mode judgement circuit configured to provide a mode signal to determine a first drive mode or a second drive mode based on a first voltage across the secondary switch and the compensation signal, and the mode signal has a first level indicating the first drive mode and a second level indicating the second drive mode; and a gate driver for being switchable in the first drive mode and the second drive mode to provide a gate voltage for controlling the secondary switch, wherein the secondary switch is turned on for a second ON-time after a current flowing through the secondary switch crosses zero in the first drive mode, and the ON-state of the secondary switch is extended for an extended ON-time in the second drive mode.

10. The isolated switching converter of claim 9, wherein:

if a valley number of the first voltage across the secondary switch is zero and the compensation signal is higher than a first threshold voltage, the mode signal becomes the second level;

if the valley number of the first voltage across the secondary switch is higher than zero, the mode signal becomes the first level; and if the compensation signal is less than a second threshold voltage, the mode signal becomes the first level, wherein the first threshold voltage is higher than the second threshold voltage.

11. The isolated switching converter of claim 9, wherein in the first drive mode:

in a first time interval, the gate voltage of the secondary switch is controlled and is kept at a third voltage;

in a second time interval, the gate voltage of the secondary switch is pulled down;

in a third time interval, the gate voltage of the secondary switch is substantially zero; and in a fourth time interval, the gate voltage of the secondary switch is pulled high to the third voltage.

12. The isolated switching converter of claim 9, wherein in the second drive mode:

in a first time interval, the gate voltage of the secondary switch is controlled and is kept at a third voltage;

in a second time interval, the gate voltage of the secondary switch is pulled down; and in a third time interval, the gate voltage of the secondary switch is pulled high to the third voltage.

13. The isolated switching converter of claim 9, wherein the gate driver comprising:

a timer circuit configured to start timing in response to a valley number of the first voltage across the secondary switch being 0, if the timing duration reaches a time threshold and the current flowing through the secondary switch is still higher than zero, the ON-state of the secondary switch is extended.

14. The isolated switching converter of claim 9, wherein the gate driver is configured to provide a primary on enable signal at an end point of the second ON-time or at an end point of the extended ON-time, and the controller further comprising:

an isolation circuit having a first input terminal to receive the primary on enable signal and a first output terminal for outputting a first synchronous signal electrically isolated from the primary on enable signal;

a zero cross detection circuit configured to provide a voltage zero-crossing detection signal by detecting whether a second voltage across the primary switch crosses zero; and a primary logic circuit configured to provide a primary control signal for controlling the primary switch based on the first synchronous signal and the voltage zero-crossing detection signal.

15. The isolated switching converter of claim 14, wherein further comprising:

a pulse signal generator configured to provide a pulse signal when a ramp signal increases to a difference between a second reference voltage and the compensation signal, wherein the ramp signal increases from zero with a slope when the primary on enable signal is activated;

the isolation circuit further has a second input terminal to receive the pulse signal and a second output terminal for outputting a second synchronous signal electrically isolated from the pulse signal; and a threshold voltage generator coupled to the second output terminal of the isolation circuit to receive the second synchronous signal and configured to provide a current threshold voltage based on the second synchronous signal.

16. A control method for an isolated switching converter, wherein the isolated switching converter has a primary switch coupled to a primary winding of a transformer, a secondary switch coupled to a secondary winding of the transformer, the control method comprising:

providing a compensation signal based on a difference between an output feedback signal representative of an output signal of the isolated switching converter and a reference voltage;

providing a mode signal to determine a first drive mode or a second drive mode based on a first voltage across the secondary switch and the compensation signal, wherein the mode signal has a first level indicating the first drive mode and a second level indicating the second drive mode;

turning on the secondary switch for a second ON-time after a current flowing through the secondary switch decreases to zero in the first drive mode; and the ON-state of the secondary switch is extended for an extended ON-time in the second drive mode.

17. The control method of claim 16, further comprising:

if a valley number of the first voltage across the secondary switch is zero and the compensation signal is higher than a first threshold voltage, the mode signal becomes the second level;

if the valley number of the first voltage across the secondary switch is higher than zero, the mode signal becomes the first level; and if the compensation signal is less than a second threshold voltage, the mode signal becomes the first level, wherein the first threshold voltage is higher than the second threshold voltage.

18. The control method of claim 16, wherein in the first drive mode:

in a first time interval, the gate voltage of the secondary switch is controlled and is kept at a third voltage;

in a second time interval, the gate voltage of the secondary switch is pulled down;

in a third time interval, the gate voltage of the secondary switch is substantially zero; and in a fourth time interval, the gate voltage of the secondary switch is pulled high to the third voltage.

19. The control method of claim 16, wherein in the second drive mode:

in a first time interval, the gate voltage of the secondary switch is controlled and is kept at a third voltage;

in a second time interval, the gate voltage of the secondary switch is pulled down; and in a third time interval, the gate voltage of the secondary switch is pulled high to the third voltage.

20. The control method of claim 16, further comprising:

starting timing in response to a valley number of the first voltage across the secondary switch being zero; and if the timing duration reaches a time threshold and the current flowing through the secondary switch is still higher than zero, the ON-state of the secondary switch is extended for the extended ON-time.

21. The control method of claim 20, further comprising:

starting timing at a start point of the extended ON-time; and if the timing duration reaches a time threshold and the current flowing through the secondary switch is still higher than zero, the ON-state of the secondary switch is extended.

22. The control method of claim 16, further comprising:

providing a primary on enable signal at an end point of the second ON-time or at an end point of the extended ON-time;

receiving a first synchronous signal electrically isolated from the primary on enable signal through an isolation circuit; and providing a primary control signal for controlling the primary switch based on the first synchronous signal and a voltage zero-crossing detection signal indicating whether a second voltage across the primary switch crosses zero.

23. The control method of claim 22, further comprising:

increasing a ramp signal from zero with a slope when the primary on enable signal is activated;

providing a pulse signal when the ramp signal increases to a difference between a second reference voltage and the compensation signal;

receiving the pulse signal and outputting a second synchronous signal electrically isolated from the pulse signal through the isolation circuit; and provide a current threshold voltage based on the second synchronous signal.

* * * * *